E. BARROWCLOUGH.
Nut or Collar Lock.
No. 159,491. Patented Feb. 9, 1875.
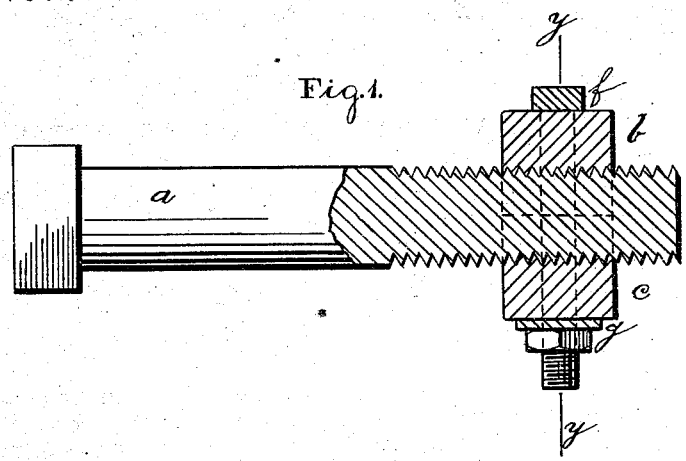
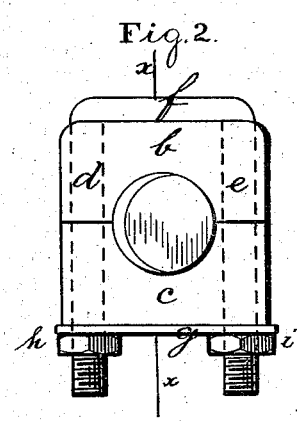
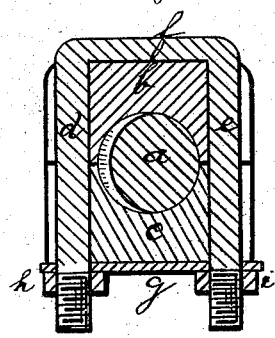
Witnesses:
Benj. F. Quimby
Thos. A. Burtt
Inventor:
E. Barrowclough

UNITED STATES PATENT OFFICE.

EDWARD BARROWCLOUGH, OF CHESTER, PENNSYLVANIA.

IMPROVEMENT IN NUT OR COLLAR LOCKS.

Specification forming part of Letters Patent No. 159,491, dated February 9, 1875; application filed January 8, 1875.

*To all whom it may concern:*

Be it known that I, EDWARD BARROWCLOUGH, of Chester, Delaware county, Pennsylvania, have invented a Split Nut or Collar, of which the following is a specification:

The device herein described is applicable more especially to draw-bar bolts of railroad-cars. Such bolts, being difficult of access, and being located where they are liable to rust, cannot be advantageously secured by ordinary nuts. Keys are generally employed instead of nuts for fastening draw-bar bolts to the frame-work of cars; but keys in such situations are soon cut and worn by the vibrations of the cars, and when their removal becomes necessary they have to be chiseled off.

The object of my invention is to construct a nut which can be easily screwed on bolts to which it may be applied, and when in position can be made to bind the bolt. My invention consists of a nut in two parts, recesses being formed in two of the opposite edges of the united parts, to receive the bolts or legs of the clamp employed, in connection with a strap or straps and fastening devices, as hereinafter described, for securing the two parts of the split nut together.

In the drawings, Figure 1 represents a draw-bar bolt, partly in elevation and partly in longitudinal section, and a section on the line $x$ $x$ of Fig. 2 of the parts of the split nut, and of the clamp and strap employed for fastening the two parts of the nut together. Fig. 2 is a face view of the nut, clamp, and strap. Fig. 3 is a section on the line $y$ $y$ of Fig. 1.

$a$, Figs. 1 and 3, represents the draw-bar bolt. $b$ and $c$ are the two parts of the nut. Two of the opposite edges of the parts $b$ and $c$ are channeled out, forming recesses of about the depth indicated in Figs. 2 and 3, for the legs $d$ and $e$ of the clamp $f$. $g$ is a strap, through the apertures in which the legs $d$ and $e$ are passed. Ordinary burrs, $h$ and $i$, preferably made of brass, serve to keep the strap $g$ in place, and thus to bind the two parts $b$ and $c$ of the nut together. Instead of the clamp $f$, with its two legs $d$ and $e$, two ordinary bolts may take the place of said legs, such bolts being secured at both ends by straps and burrs similar to strap $g$ and burrs $h$ and $i$; and in place of the burrs $h$ and $i$, keys may be employed. Thus, slots or key-holes may be formed in the legs $d$ and $e$ of clamp $f$; or, if two bolts be used in place of the clamp $f$, then such key-holes may be formed in each end of such bolts, and keys may be passed through said key-holes to secure the strap or straps $g$ in position. When the split nut has been screwed into place on its bolt the burrs $h$ and $i$, or substituted keys, are tightened in the usual manner, and the split nut is thus made to jam or firmly bind the bolt.

The split nut and the bolt thus far described have screw-threads on them, as in ordinary bolts and nuts. The bolts, however, may be made plain or without screw-threads, and a shallow recess—say, one-eighth of an inch in depth, and of any desired width—may be formed in the body of the bolt, near the head of the bolt, and a plain split collar or nut made in two parts, but without screw-threads, may be applied to such recess, and secured by clamp or side bolts, or otherwise, as first above described.

I prefer to construct the split nut and bolt with screw-threads, as first above described.

I claim—

The split nut or collar consisting of two parts recessed on their opposite exterior edges, in combination with the clamp $f$ or side bolts, the strap or straps $g$, and the devices for fastening such strap or straps, substantially as set forth.

E. BARROWCLOUGH.

Witnesses:
 ROBT. SMITH, Jr.,
 JOHN W. PENNELL.